United States Patent
Aoki et al.

(10) Patent No.: US 9,612,405 B2
(45) Date of Patent: Apr. 4, 2017

(54) OPTICAL CONNECTOR, ELECTRONIC APPARATUS, AND OPTICAL CONNECTOR MOUNTING METHOD

(71) Applicant: FUJITSU LIMITED, Kawasaki-shi, Kanagawa (JP)

(72) Inventors: Tsuyoshi Aoki, Machida (JP); Shigenori Aoki, Atsugi (JP); Hidenobu Muranaka, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 14/474,233

(22) Filed: Sep. 1, 2014

(65) Prior Publication Data

US 2015/0117821 A1    Apr. 30, 2015

(30) Foreign Application Priority Data

Oct. 24, 2013  (JP) .................. 2013-221217

(51) Int. Cl.
| | |
|---|---|
| *G02B 6/38* | (2006.01) |
| *G02B 6/42* | (2006.01) |
| *G02B 6/30* | (2006.01) |
| *G02B 6/43* | (2006.01) |

(52) U.S. Cl.
CPC ........... *G02B 6/381* (2013.01); *G02B 6/3851* (2013.01); *G02B 6/3855* (2013.01); *G02B 6/4249* (2013.01); *G02B 6/30* (2013.01); *G02B 6/3839* (2013.01); *G02B 6/4292* (2013.01); *G02B 6/43* (2013.01); *Y10T 29/49181* (2015.01)

(58) Field of Classification Search
CPC .... G02B 6/381; G02B 6/3851; G02B 6/3855; G02B 6/3881
See application file for complete search history.

(56) References Cited

U.S. PATENT DOCUMENTS

| | | | | |
|---|---|---|---|---|
| 5,905,829 A | * | 5/1999 | Maenishi | G02B 6/2556 385/59 |
| 6,079,880 A | * | 6/2000 | Blom | G02B 6/4292 385/139 |
| 6,095,695 A | * | 8/2000 | Ohtsuka | G02B 6/3825 385/134 |

(Continued)

FOREIGN PATENT DOCUMENTS

| | | |
|---|---|---|
| CN | 1322230 | 11/2001 |
| CN | 1101940 | 2/2003 |

(Continued)

OTHER PUBLICATIONS

T. Lamprecht, et al.,"Passive Alignment of Optical Elements in a Printed Circuit Board", Electronic Components and Technology Conference (ECTC) Proc. 761, (2006), pp. 761-767.

(Continued)

*Primary Examiner* — Daniel Petkovsek
(74) *Attorney, Agent, or Firm* — Fujitsu Patent Center (57) ABSTRACT

An optical connector includes at least one optical fiber, and a ferrule configured to hold the optical fiber. In the optical connector, the ferrule has a hook and a presser member on a front part of a bottom face of the ferrule, and a projection on a rear part of the bottom face of the ferrule, in a connecting direction, and the optical fiber is held obliquely downward from a rear end of the ferrule toward the presser member of the ferrule.

7 Claims, 10 Drawing Sheets

(56) References Cited

U.S. PATENT DOCUMENTS

| | | | | |
|---|---|---|---|---|
| 6,116,791 | A * | 9/2000 | Laninga | G02B 6/3829 385/83 |
| 6,331,080 | B1 | 12/2001 | Cole et al. | |
| 6,516,104 | B1 * | 2/2003 | Furuyama | G02B 6/4214 385/14 |
| 7,892,012 | B1 * | 2/2011 | Foung | H01R 13/6272 439/344 |
| 8,483,571 | B2 * | 7/2013 | McColloch | G02B 6/4206 359/629 |
| 8,678,670 | B2 * | 3/2014 | Takahashi | G02B 6/3846 385/136 |
| 8,985,865 | B2 * | 3/2015 | Howard | G02B 6/3829 385/79 |
| 2011/0045683 | A1 | 2/2011 | Foung | |
| 2011/0124217 | A1 | 5/2011 | Foung | |
| 2015/0117821 | A1 | 4/2015 | Aoki et al. | |

FOREIGN PATENT DOCUMENTS

| | | |
|---|---|---|
| CN | 101997234 | 3/2011 |
| CN | 202735541 | 2/2013 |
| JP | 11-109186 | 4/1999 |
| TW | 424164 | 3/2001 |
| TW | 201108523 | 3/2011 |
| WO | 00/22060 | 4/2000 |

OTHER PUBLICATIONS

CNOA—Office Action mailed on Nov. 3, 2015 issued with respect to the corresponding Chinese Patent Application No. 201410486710.X, with full English translation.

TWOA—Office Action dated Jul. 9, 2015 issued with respect to the corresponding Taiwanese Patent Application No. 103129685, with partial English translation.

CNOA—Office Action mailed on Nov. 28, 2016 issued with respect to the corresponding Chinese Patent Application No. 201410486710.X, with full English translation.

USPTO, Non-Final Rejection mailed Jan. 19, 2017 in related U.S. Appl. No. 15/379,412.

* cited by examiner

OPTICAL CONNECTOR, ELECTRONIC APPARATUS, AND OPTICAL CONNECTOR MOUNTING METHOD

CROSS-REFERENCE TO RELATED APPLICATION

This patent application is based upon, and claims the benefit of priority of Japanese Patent Application No. 2013-221217 filed on Oct. 24, 2013, the entire contents of which are incorporated herein by reference.

FIELD

The disclosures discussed herein relate to an optical connector, an electronic apparatus using the same, and an optical connector mounting method.

BACKGROUND

In recent technologies of super computers or servers, optical interconnections achieving low loss and low power-consumption have attracted attention along with an increase in use of broadband communications. For example, in high-speed optical interconnect packages, a number of large scale integration (LSI) packages are disposed on a board, and optical interconnect transceivers are disposed around the LSI within each package. Optical waveguides are formed from the optical transceivers toward ends of the package. The above configuration may shorten the length of electric signal wiring to provide a benefit of high-speed driving. Connecting destinations of the interconnects may include other LSIs, memories, storages, and the like to implement ultra-high speed and large-capacity transmissions.

In large-scale computers such as supercomputers or servers, the LSIs or optical elements on the package substrate may fail with a certain probability. In a configuration having plural LSI packages on a board, the failed LSIs or optical elements are replaced or maintained by reflowing per package. In view of detachment in such replacement or in view of cost efficiency, it is preferable to connect optical connectors to optical transmission paths, such as waveguides or optical fibers, on the package. In addition, it is desirable to provide low-loss optical connections in view of performance and reliability.

To mount a package, the size of the package substrate is restricted considering its warpage. Hence, the optical connectors are mounted merely in a limited, narrow area of a peripheral part of the LSI based on the size of the LSI. Thus, smaller and low-loss optical connectors may be desirable to be mounted on the package.

Lamprecht, et al. (referred to as "Non-Patent Document 1"), for example, discloses a technology to mount an adaptor connectable to a mechanically transferrable (MT) interface on the package substrate so as to connect the optical connectors to commercially available MT ferrules via the adaptors. However, the above-described technology using the adapters may require a large amount of manpower for accurate mounting. Further, the above technology may require a separate mechanical element to press the ferrules or fibers to be mounted on the substrate with respect to waveguides, which results in higher cost.

On the other hand, Japanese Laid-open Patent Publication No. 11-109186 (referred to as "Patent Document 1") discloses a technology to dispose a fiber guide component on a substrate to align optical fibers in V-grooves of the fiber guide component. This fiber guide component is used for aligning optical fibers utilizing a groove structure of the fiber guide component. However, this fiber guide component is not used as a removable connector.

In implementing optical interconnection using such a removable connector, the fiber guide component having the V-grooves may need improvement to some more extent. This is because the optical fibers that are held by the removable connector need to move along a groove structure of the substrate. In this case, ends of adjacent optical fibers may closely approach to entangle one another. In addition, some structure to apply predetermined force to optical fibers is designed to hold the optical fibers against end faces of the waveguides formed in a photo-electronic component such as an optical package.

RELATED ART DOCUMENTS

Patent Document 1: Japanese Laid-open Patent Publication No. 11-109186

Non-Patent Document

Non-Patent Document 1: T. Lamprecht, et al., "Passive Alignment of Optical Elements in a Printed Circuit Board", Electronic Components and Technology Conference (ECTC) Proc. 761, (2006)

SUMMARY

According to an aspect of the embodiments, there is provided an optical connector that includes at least one optical fiber, and a ferrule configured to hold the optical fiber, in which the ferrule has a hook and a presser member on a front part of a bottom face of the ferrule, and a projection on a rear part of the bottom face of the ferrule in a connecting direction, and in which the optical fiber is held obliquely downward from a rear end of the ferrule toward the presser member of the ferrule.

According to another aspect of the embodiments, there is provided a method for mounting at least one optical connector that includes inserting the optical connector in a ferrule obliquely downward from a rear end of the optical connector toward a presser member of the ferrule, the ferrule having a hook and the presser member on a front part of a bottom face of the ferrule and a projection on a rear part of the bottom face of the ferrule, in a connecting direction; providing a first hole configured to receive the hook, a second hole configured to receive the projection, a groove configured to receive the optical fiber, and a space between the groove and an end of the substrate in a substrate on which the optical connector is to be mounted, guiding the optical fiber obliquely within the groove to connect the optical fiber to a waveguide in the substrate by fitting the hook into the first hole and fitting the projection into the second hole; and tightly holding the optical fiber to the waveguide by a buckling force of the optical fiber connected to the waveguide and bending within the space.

It is to be understood that both the foregoing general description and the following detailed description are exemplary and explanatory and are not restrictive of the invention.

Additional objects and advantages of the embodiments will be set forth in part in the description which follows, and in part will be obvious from the description, or may be learned by practice of the invention.

DESCRIPTION OF EMBODIMENTS

According to an aspect of the embodiments, it is desirable to provide an optical connector capable of being reliably mounted on a substrate with ease and an electronic apparatus having such an optical connector.

Figure 1A:
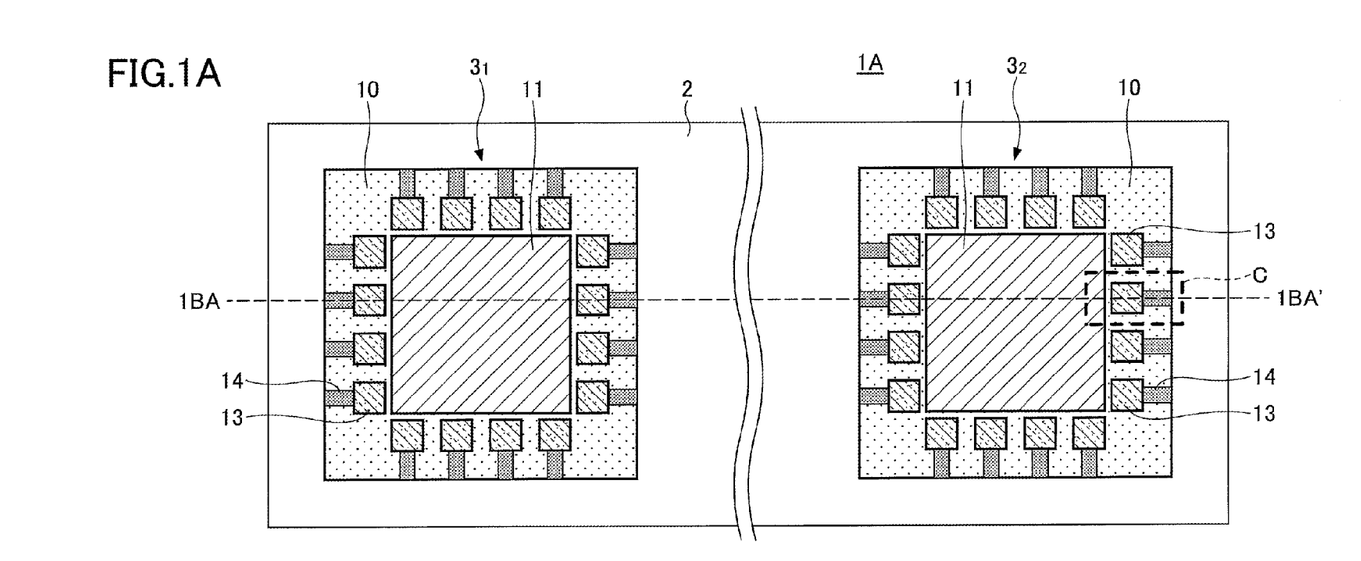
FIGS. 1A and 1B are diagrams illustrating a system board as an example of an electronic apparatus to which an optical connector according to an embodiment is applied.
Figure 1B:
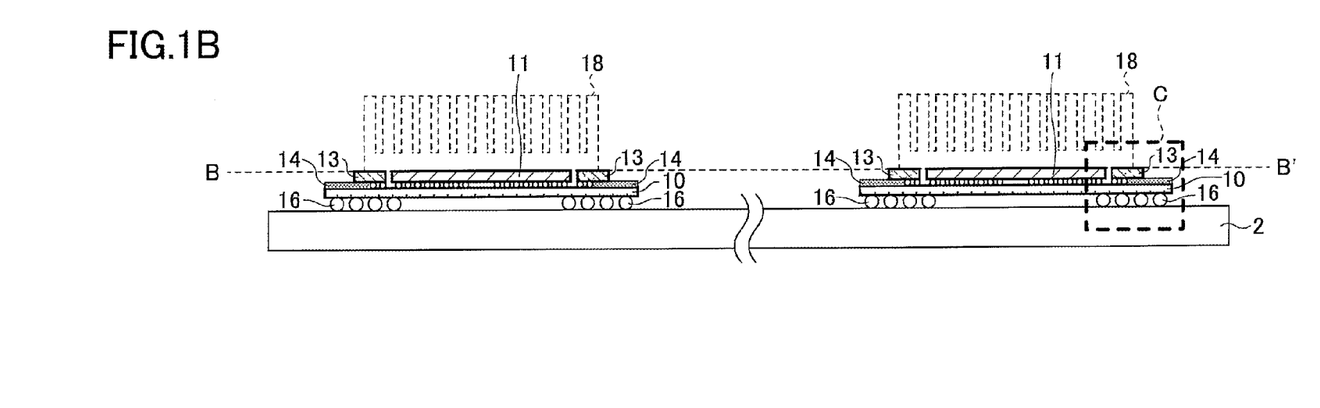

Preferred embodiments are described below with reference to the accompanying drawings. FIGS. 1A and 1B are diagrams illustrating a system board 1A as an example of an electronic apparatus to which an optical connector according to an embodiment is applied. FIG. 1A is a plan diagram and FIG. 1B is a cross-sectional diagram cut along 1BA-1BA' of FIG. 1A. LSI packages $3_1$, $3_2$, ... (hereinafter generically called an "LSI package 3") are disposed on a board 2. Each LSI package 3 is mounted on the board 2 with solder bumps 16. A heat sink 18 for air cooling or a cooling plate for water cooling is disposed on an upper surface of the LSI package 3.

In the LSI package 3, optical interconnect transceivers 13 are disposed around an LSI chip 11 on a package substrate 10. Respective sets of waveguides 14 are formed from the optical transceivers 13 toward ends of the package substrate 10. The waveguides 14 are formed in the above configuration to keep the length of electric signal wiring as short as possible in order to achieve high-speed driving with optical signals. In this embodiment, holes and spaces for fixing the optical connectors, and grooves for holding optical fibers are formed in advance, as described later.

Figure 2A:
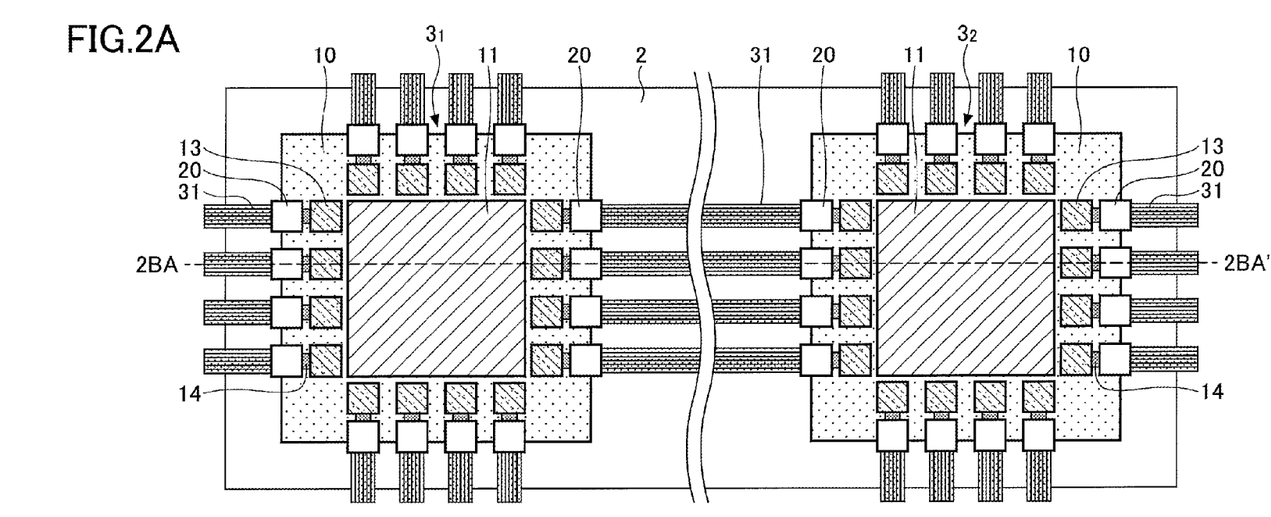
FIGS. 2A and 2B are diagrams illustrating optical paths connected to a packaged LSI on the system board via optical connectors.
Figure 2B:
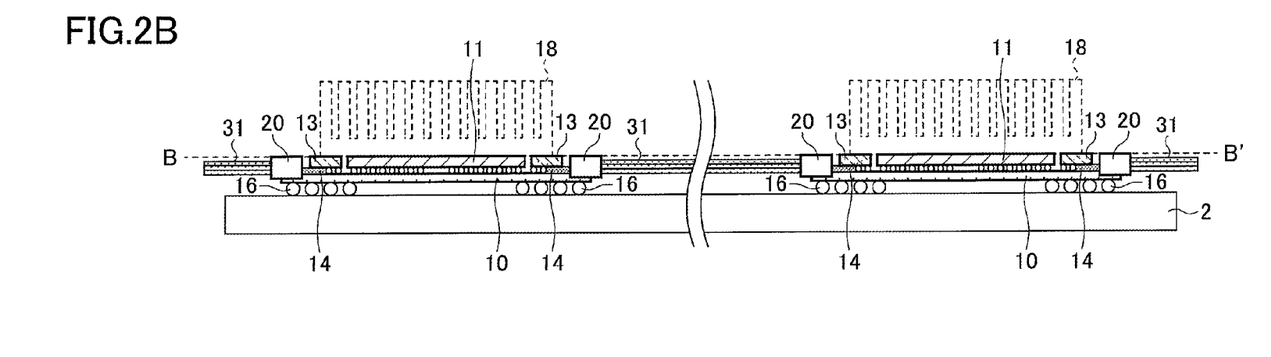

FIGS. 2A and 2B are diagrams illustrating optical connectors 20 mounted on the LSI package 3. Each of the optical connectors 20 is optically connected to a corresponding set of the waveguides on the package substrate 10 in the peripheral part of the package substrate 10. Intervals between adjacent LSI packages 3, or intervals between the LSI packages 3 and other electric components are connected by optical transmission paths 31 via optical connectors 20. In this embodiment, the optical transmission path 31 may be a multi-fiber interconnect.

Figure 3A:
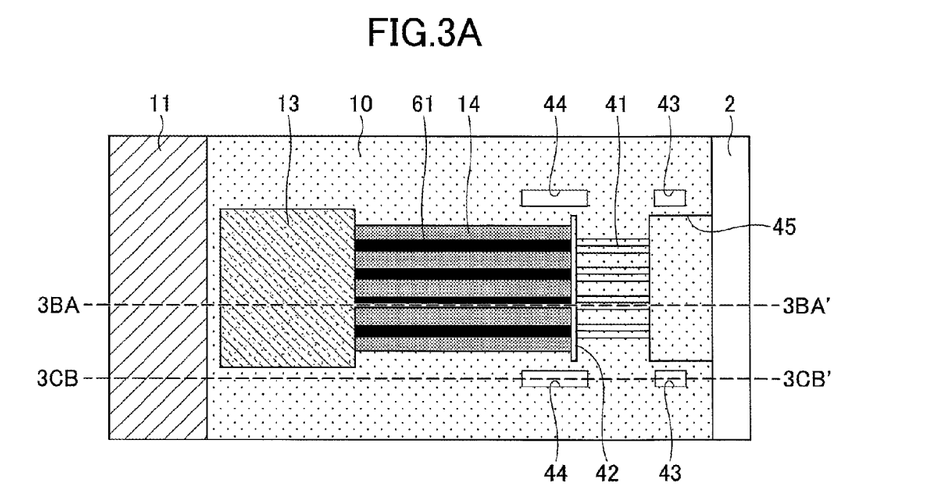
FIGS. 3A to 3C are diagrams illustrating configurations of a peripheral part of a package substrate.
Figure 3B:
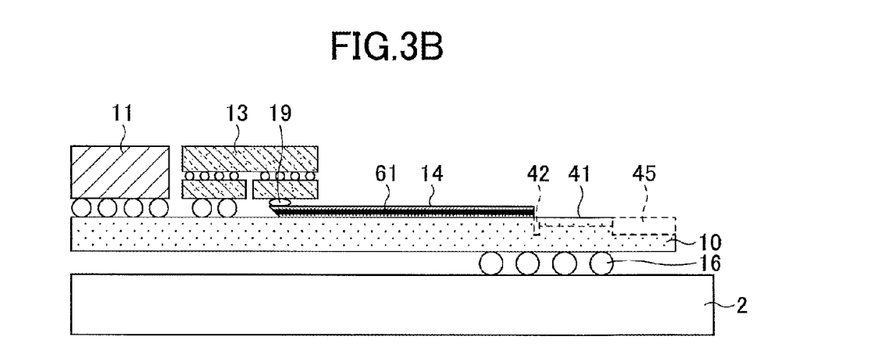
Figure 3C:
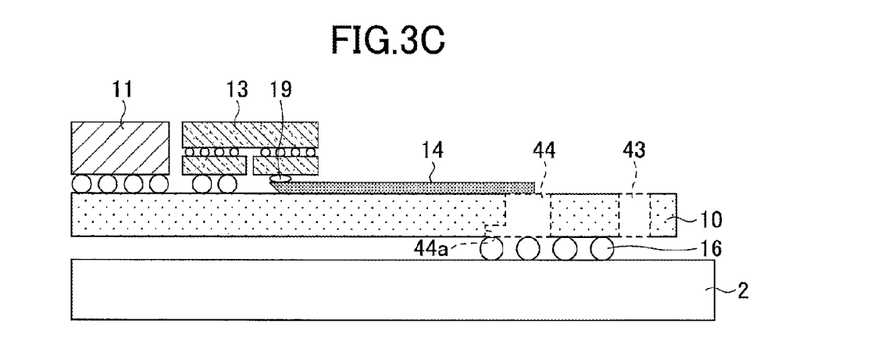

FIGS. 3A and 3B are diagrams illustrating a configuration of a peripheral area C of the package substrate 10 of FIGS. 1A and 1B. FIG. 3A is a plan diagram, FIG. 3B is a cross-sectional diagram cut along 3BA-3BA' of FIG. 3A, and FIG. 3C is a side diagram viewed from 3CB-3CB' of FIG. 3A. Although not illustrated in details, the optical transceiver 13 includes a light source such as a vertical cavity surface emitting laser (VCSEL) and a drive circuit on its transmitting side, and a photodetector such as a photodiode (PD) and a current-voltage converter such as a transimpedance amplifier circuit on its receiving side.

The waveguides 14 extending from the optical transceiver 13 toward the end of the package substrate 10 include plural waveguide cores 61. The waveguides 14 include a not-illustrated mirror to achieve optical coupling at low loss via the VCSEL, the PD, and a lens 19 of the optical transceiver 13.

A space 45 is formed in an edge area of the package substrate 10 that faces the ends of the waveguides 14. The space 45 serves as space to absorb flexure of the optical fibers when the optical connectors 20 are mounted on the package substrate 10. Grooves 41 for holding the optical fibers are formed between the ends of the waveguides 14 and the space 45. The center of each groove 41 is aligned with the center of the corresponding waveguide core 61. In aligning cross sections of the waveguides 14, a space 42 is formed between the grooves 41 and the waveguides 14. However, the presence of the space 42 will not affect optical coupling between the waveguide cores 61 and the optical fibers of the optical connectors 20.

Holes 43 are formed one at each side of the space 45, and holes 44 are formed one at each side of the space 42 and the optical transmission path 14. The holes 43 are configured to receive projections of the optical connector 20, and the holes 44 are configured to receive hooks of the optical connector 20. Each hole 44 has an L-shaped cross section serving as an engage part 44a to allow the corresponding hook to engage in.

The grooves 41 are formed by dicing or injection molding. The holes 43 and 44, and the space 45 may, for example, be formed by laser processing. The waveguides 14 may be polymer waveguides formed by an exposure process to match the positions of the grooves 41.

Figure 4A:
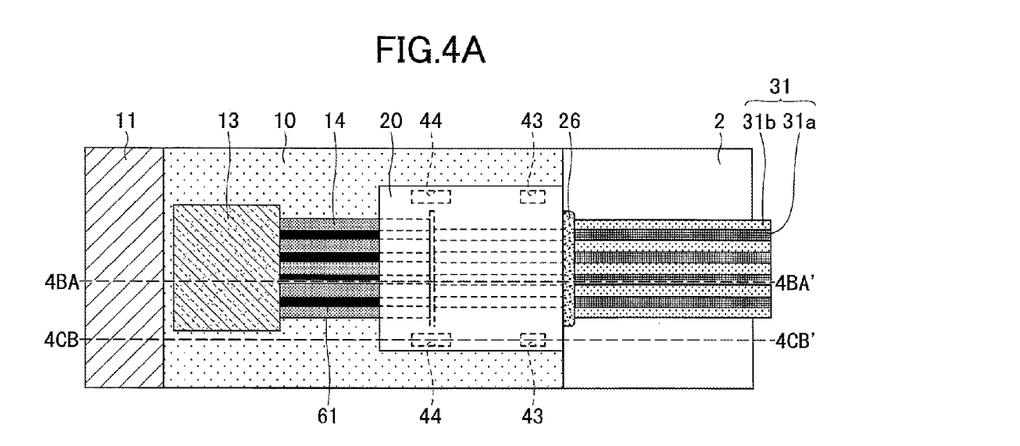
FIGS. 4A to 4C are diagrams illustrating an optical connector connected in the peripheral part of the package.
Figure 4B:
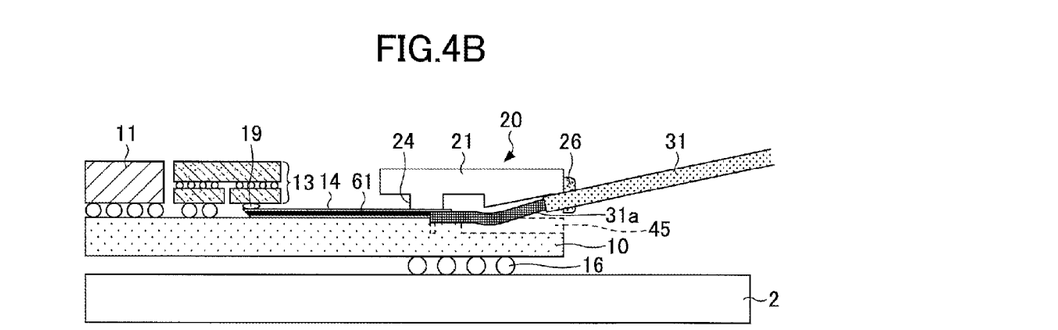
Figure 4C:
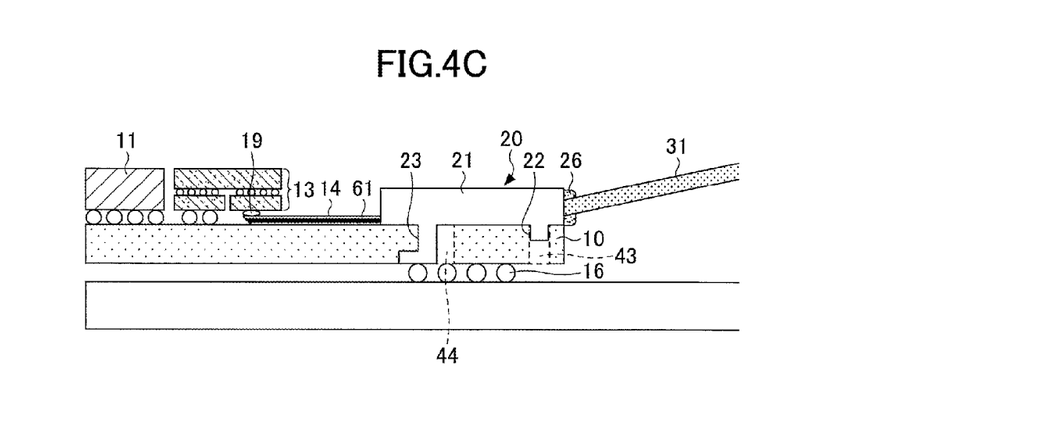

FIGS. 4A to 4C are diagrams illustrating the optical connector 20 connected to the waveguides 14 in the peripheral part of the package substrate 10. FIG. 4A is a plan diagram, FIG. 4B is a cross-sectional diagram cut along 4BA-4BA' of FIG. 4A, and FIG. 4C is a side diagram viewed from 4CB-4CB' of FIG. 4A. In the example of FIGS. 4A to 4C, the optical transmission path 31 is a fiber optic ribbon 31, which is formed by aligning optical fibers 31a in a plane, and bundling the optical fibers 31a in a coating 31b. In the optical connector 20, the optical fibers 31a are exposed from the fiber optic ribbon 31 to extend to an end face of the waveguides 14.

A part of the fiber optic ribbon 31 or exposed parts of the optical fibers 31a are fixed to a ferrule 21 with adhesive 26 such that the optical fibers 31a slope downward from a rear end to a front side of the ferrule 21. Each of the optical fibers 31a is held by a corresponding one of the grooves 41 (see FIGS. 3A to 3C), and leading ends of the optical fibers 31a are optically connected to the waveguides 14. In this configuration, the optical fibers 31a are pressure-held in the respective grooves by a presser member 24 of the ferrule 21 such that the optical fibers 31a are optically coupled with the waveguides 14 with stability, as illustrated in FIG. 4B.

Further, the hooks 23 and the projections 22 of the ferrule 21 are fit in the holes 44 and 43 of the package substrate 10, respectively, such that the optical connector 20 is fixed to the package substrate 10, as illustrated in FIG. 4C.

Figure 5A:
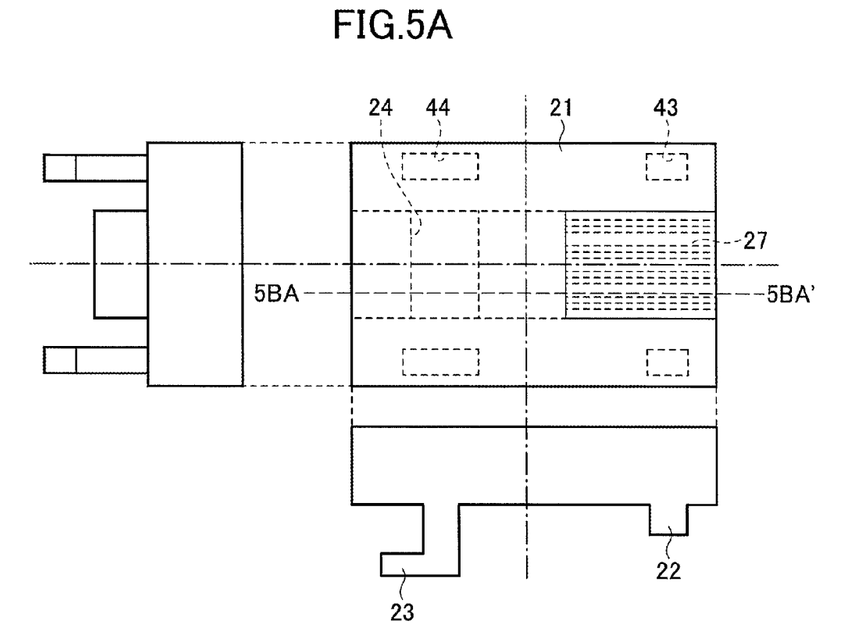
FIGS. 5A and 5B are diagrams illustrating a configuration of a ferrule of the optical connector, and positional relationships between grooves and holes formed in the package substrate.
Figure 5B:
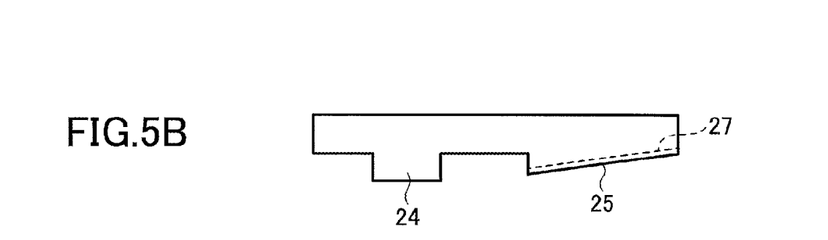

FIGS. 5A and 5B illustrate a configuration of the ferrule 21 of the optical connector 20. FIG. 5A is a three-sided diagram (top, front, and side diagrams) of the ferrule 21, and FIG. 5B is a cross-sectional diagram cut along 5BA-5BA' of FIG. 5A. The ferrule 21 may be made of plastic and be formed by injection molding. As an example of the size of the ferrule 21, a dimension in an optical axis direction (a connecting direction) is 8 mm, a dimension in a fiber alignment direction (a width direction) is 4 mm, and a dimension in a height direction (a thickness direction) is 2 mm.

The ferrule 21 includes the hooks 23 on the front side in the connecting direction, and the projections 22 on the rear side in the connecting direction. Each of the hooks 23 is disposed at a position of a corresponding one of the holes 44 in the package substrate 10, and each of the projections 22 is disposed at a position of a corresponding one of the holes 43 in the package substrate 10. The distance between the centers of the hook 23 and the projection 22 measured at their joint part level is slightly wider than the distance between the centers of the hole 44 and the hole 43 at an upper surface level of the package substrate 10. In this configuration, the optical connector 20 is fixed to the package substrate 10 by friction or attaching force when the optical connector 20 is mounted, as described later.

Further, the package substrate 10 is sandwiched between L-shaped parts of the hooks 23. The ferrule 21 may be elastically deformed in a height direction by setting the heights of the sandwiching parts of the hooks 21 to be less than the thickness of the package 10, such that the optical connector 20 may be stably held with respect to the package substrate 10 in cooperation with the pressure part 24 of the ferrule 21. In the example of FIGS. 5A and 5B, each hook 23 is an L-shaped hook; however, each corner of the L-shaped hook may be chamfered.

The presser member 24 is configured to press the optical fibers 31a with respect to the package substrate 10. The presser member 24 is disposed between the two hooks 23 on the front side of the ferrule 21. As described with reference to FIG. 4B, the optical fibers 31a are stably held by the presser member 24 at a connecting part where the optical fibers 31a are connected to the waveguides 14.

A sloping part 25 configured to hold the optical fibers 31a between the two projections 22 at predetermined pitches maybe disposed on the rear side of the ferrule 21. The sloping part 25 includes grooves (or projections) 27 to hold the optical fibers 31a. Thus, the optical fibers 31a may be held by the grooves (or projections) 27 at predetermined pitches from a fixing part (adhesive) 26 to a connecting part where the optical fibers 31a are connected to the waveguides 14. The optical fibers 31a may be mounted obliquely downward along the grooves 27 in the sloping part 25. The angle between the sloping part 25 and the package substrate 10 may, for example, be 15 degrees. The sloping angle may be any angle insofar as the optical fibers 31a may be able to slide from the grooves 27 to the grooves 41 without obstruction.

Figure 6A:
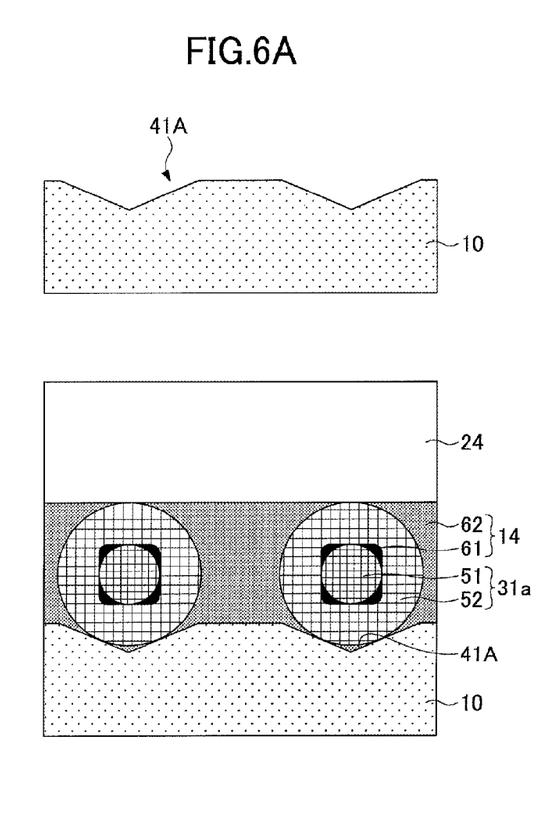
FIGS. 6A and 6B are diagrams illustrating a positional relationship between a connecting surface of the waveguide in the package substrate and a connecting surface of the optical fiber of the optical connector.
Figure 6B:
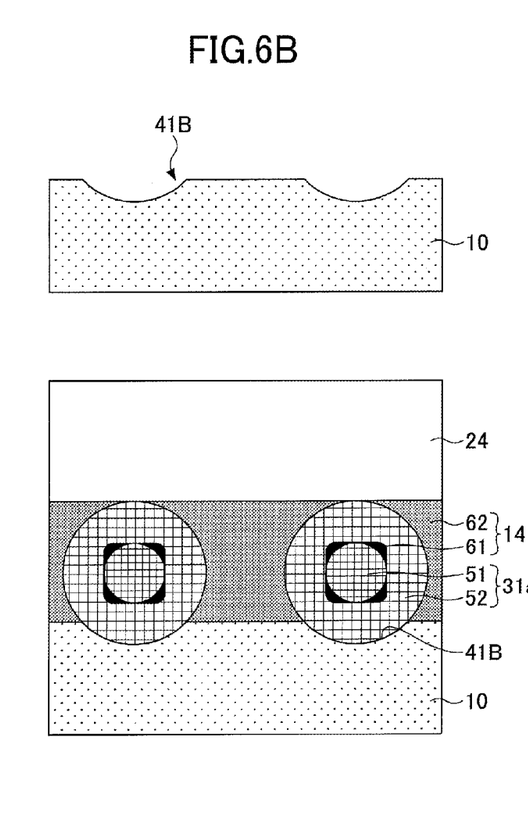

FIGS. 6A and 6B are diagrams illustrating a cross section of connecting parts of the waveguides 14 on the package substrate 10 connected to the optical fibers 31a of the optical connector 20. The grooves in the package substrate 10 may be V-grooves 41A as illustrated in FIG. 6A, or U-grooves as illustrated in FIG. 6B. The optical fibers 31a that are either held in the V-grooves 41A or U-grooves 41B are fixed by the presser member 24 in connecting areas where the optical fibers 31a are connected to the waveguides 14.

Each of the optical fibers 31a includes a fiber core 51 having a round cross section and a fiber cladding 52. The waveguides 14 includes the waveguide cores 61 having a rectangular cross section aligned at predetermined pitches within a waveguide cladding 62. The optical fibers 31a are held in the V-grooves 41A or U-grooves 41B such that the center of each fiber core 51 matches the center of the corresponding waveguide core 61. Hence, the depth of each V-groove 41A or U-groove 41B is set in a condition where when the optical fibers 31a and the waveguides 14 are pressed by the presser member 24, the position at the height of each fiber core 51 matches the position at the height of the corresponding waveguide core 61.

Figure 7A:
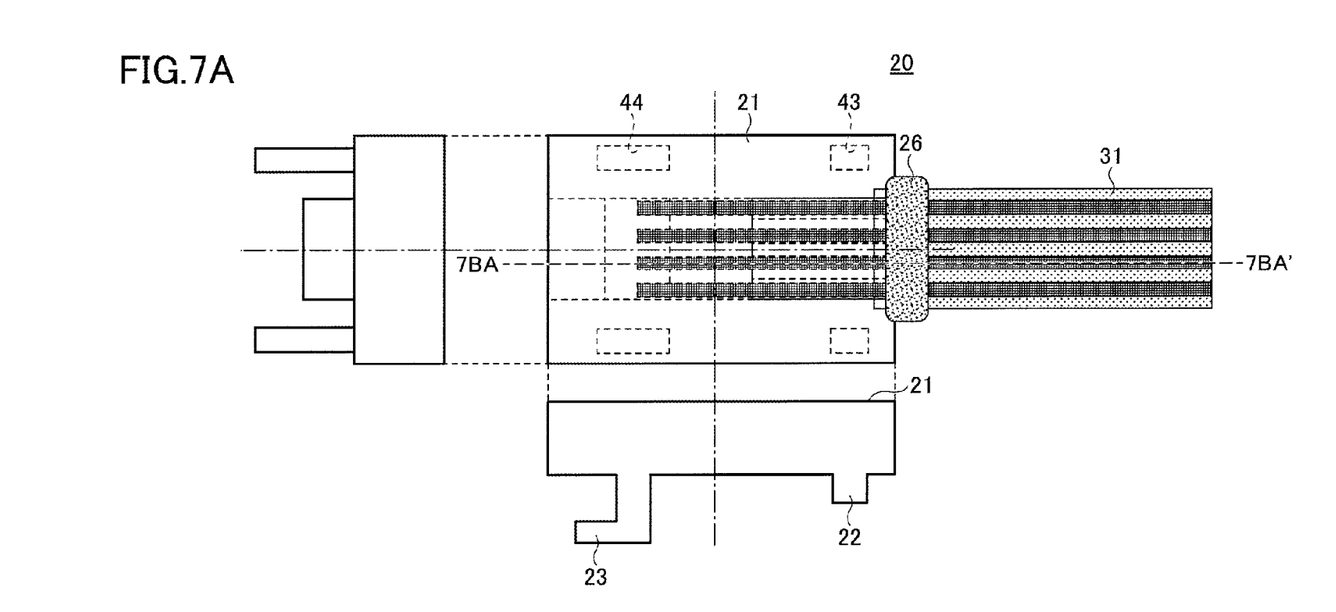
FIGS. 7A and 7B are diagrams illustrating the optical connector having a ferrule in which the optical fibers are implemented.
Figure 7B:
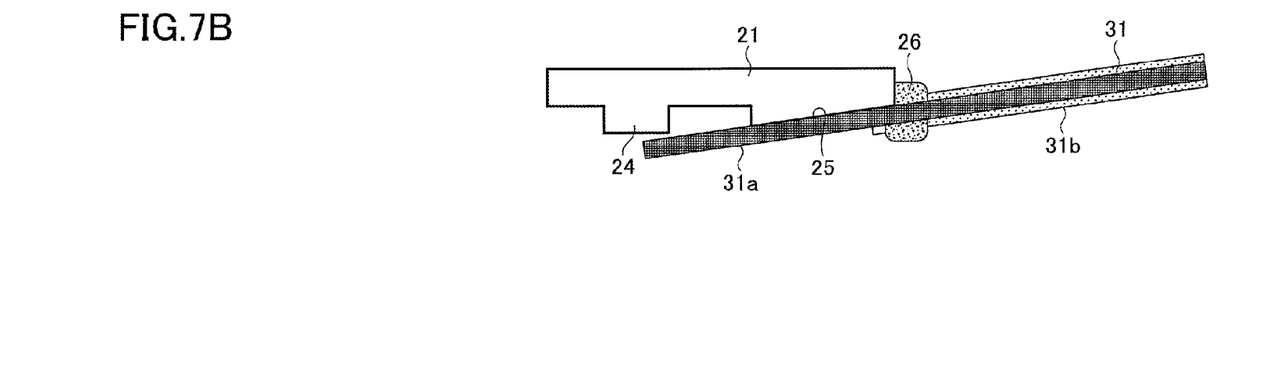

FIGS. 7A and 7B illustrate the optical connector 20 on which the fiber optic ribbon 31 is mounted. The optical fibers 31a may become mutually independent by removing a coating 31b from an end part of the fiber optic ribbon 31. Parts of the optical fibers 31a held by the coating 31b of the fiber optic ribbon 31 or exposed from the fiber optic ribbon 31 to become mutually independent are fixed to the rear end (a base part) of the ferrule 21 by the fixing part 26 formed of adhesive such as epoxy adhesive.

The optical fibers 31a are disposed along the grooves 27 (see FIGS. 5A and 5B) formed in the sloping part 25 of the ferrule 21, and the leading ends of the optical fibers 31a extend to underneath the presser member 24. When the optical connector 20 is mounted on the package substrate 10, the leading ends of the optical fibers 31a are pressed by the presser member 24 and the optical fibers 31a bend or buckle in a direction vertical to a plane of the package substrate 10 (i.e., an amplitude direction). The buckling parts of the optical fibers 31a are housed in the space 45 formed in the package substrate 10.

The optical fibers 31a may be multi-mode fibers or single-mode fibers according to precision. The optical fibers 31a may be polymer clad fibers or plastic fibers when thin fibers are required. The leading ends of the optical fibers 31a are cut by cleaver or laser, and the cut leading ends of the optical fibers 31a vary in length. The variability in length may be approximately 100 μm, or 100 μm or less. As described above, the variability in length may be absorbed by bending the optical fibers 31a when the optical connector 20 is mounted on the package substrate 10. Further, since the bending load based on the bending of the optical fibers 31a is applied to the waveguides 14, the optical fibers 31a may be stably connected to the waveguides 14. The length of the independent part exposed from the coating 31b of each optical fiber 31a may be 7 mm, for example, which is a negligible length with respect to the bending loss when the optical fiber 31a is bent.

Figure 8A:
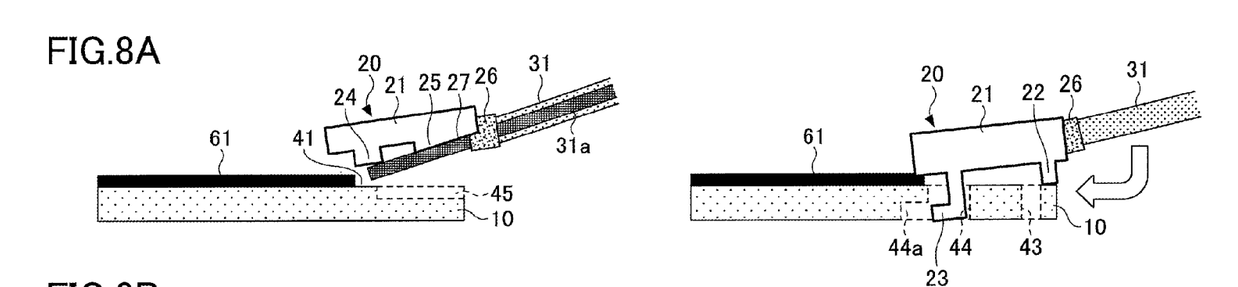
FIGS. 8A to 8C are diagrams illustrating a sequence of fitting the optical connector into the package substrate.
Figure 8B:
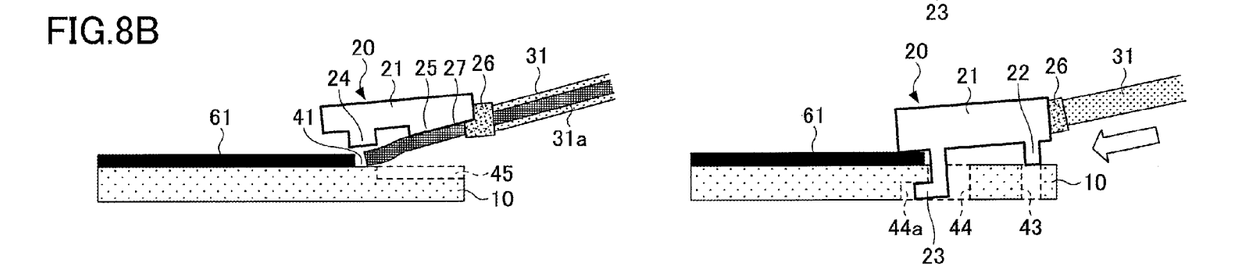
Figure 8C:
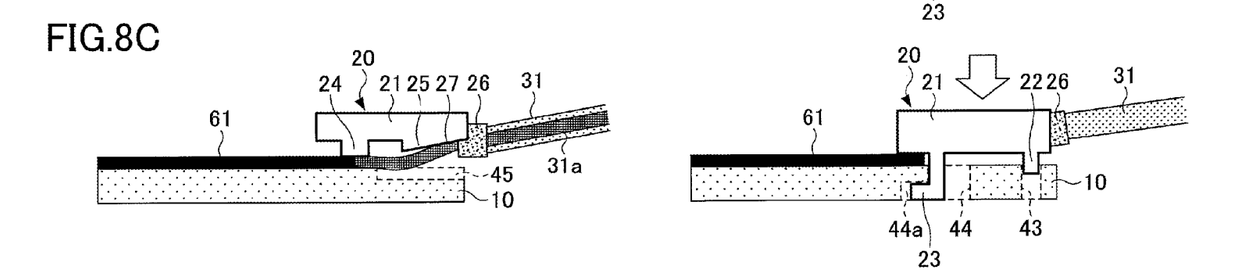

FIGS. 8A to 8C illustrate a fitting sequence of the optical connector 20 with respect to the package substrate 10. In each process of the fitting sequence, a left-hand side diagram indicates a side diagram (a cross section along the waveguide core 61) viewed from 3BA-3BA' of FIG. 3A, and a right-hand side diagram indicates a side diagram viewed from 3CA-3CA' of FIG. 3A.

As illustrated in FIG. 8A, the optical connector 20 is moved obliquely downward from the upper side to the package substrate 10, and the hook 23 of the ferrule 21 is inserted into the hole 44 of the package substrate 10. In this configuration, the projection 22 at a rear part of the ferrule 21 is yet to be fitted into the hole 43. The optical fiber 31a exposed from the coating 31b is moved toward the package substrate 10 while the grooves 27 in the sloping part 25 of the ferrule 21 maintain predetermined pitches.

As illustrated in FIG. 8B, the ferrule 21 is hooked on the package substrate 10 by pushing the end of each hook 23 into a corresponding engaging hole 44a of the hole 44 in the package substrate 10. The end of each optical fiber 31a is placed in the corresponding groove 41 formed in the package substrate 10 by the presence of the presser member 24, and is guided to a connecting position where the optical fiber 31a is connected to the waveguide core 61.

As illustrated in FIG. 8C, the optical connector 20 pressed downward toward the package substrate 10 while the end of each optical fiber 31a is kept in contact with the waveguide core 61. Hence, the projection 22 at the rear part of the ferrule 21 is inserted into the hole 43. As illustrated above, the distance between the hook 21 and the projection 22 measured at their joint part level of the ferrule 21 is configured to be slightly wider than the distance between the holes 44 and 43 measured at the upper surface level of the package substrate 10. When the projection 22 is inserted into the hole 32, the ferrule 21 slightly deforms while still having residual stress. The optical connector 20 is fixed by the friction between a lateral surface of the projection 22 and a lateral surface of the hole 43.

In this configuration, each optical fiber 31a is in contact with the corresponding waveguide core 61. Hence, a part of the optical fiber 31a is detached from the groove 27 in the sloping part 25 of the ferrule 21, and the detached part of the optical fiber 31a bends within the space 45. Thus, although the bending amplitude rises to some extent, a flexure part of the optical fiber 31a may be accommodated within the space 45 formed in the package substrate 10. The bending of the optical fiber 31a within the space 45 applies the corresponding bending load from the optical fiber 31a to the waveguide core 61, where the bending load serves as pressing force. Further, a part of each optical fiber 31a is guided in the groove 27 in the sloping part 25 of the ferrule 21. Hence, the bending direction is a vertical direction with respect to the substrate surface, which may prevent the adjacent optical fibers from contacting one another.

To remove the optical connector for changing the interconnections or replacing the LSI chip 3, the sequence of processes illustrated in FIG. 8A to FIG. 8C is reversed. That is, the projection 22 is detached from the hole 43 at the rear part of the ferrule 21. Then, the entire optical connector 20 is pulled obliquely upward to detach the hook 23 from the engaging part 44a of the hole 44. Finally, the optical connector 20 is pivoted to be withdrawn from the package substrate 10.

According to this configuration, the optical connector 20 may easily and reliably be attached to or detached from the package substrate 10.

Figure 9A:
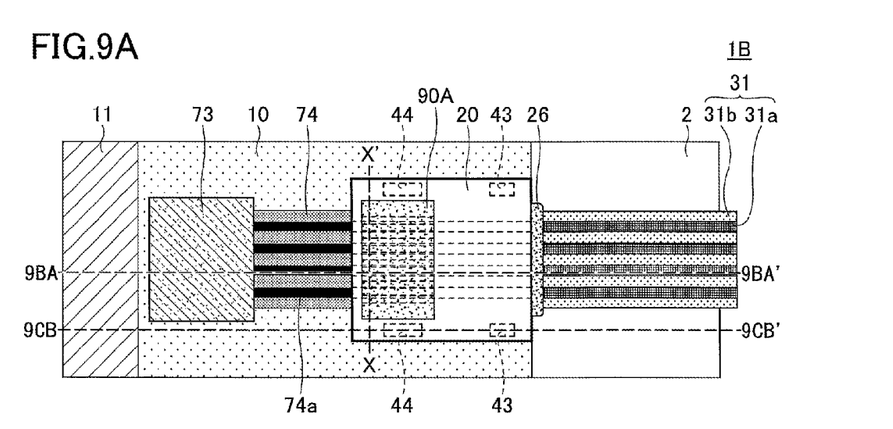
FIGS. 9A to 9D are diagrams illustrating an example of connecting the optical fibers to a pigtail optical transceiver.
Figure 9B:
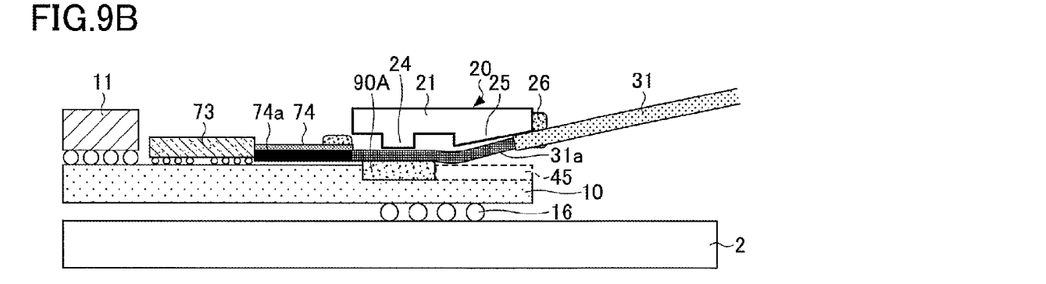
Figure 9C:
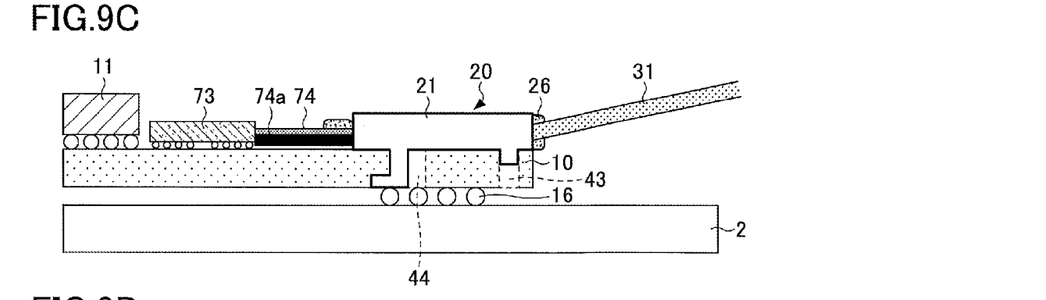
Figure 9D:
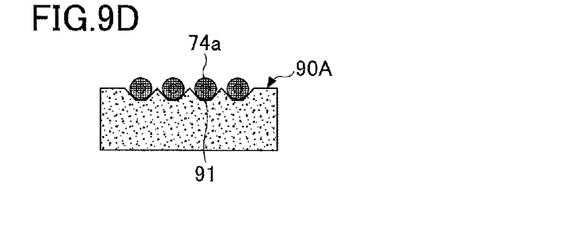

FIGS. 9A to 9D illustrate a system board 1B as another example of the electronic apparatus. FIG. 9A is a plan diagram, FIG. 9B is a cross-sectional diagram cut along 9BA-9BA' of the FIG. 9A, FIG. 9C is a cross-sectional diagram cut along 9CA-9CA' of the FIG. 9A, and FIG. 9D is a cross-sectional diagram illustrating a V-groove component 90A applied to the package substrate 10. FIGS. 9A to 9D illustrate an optical connection of an optical transceiver 73 having fiber optic pigtails 74a.

The optical fibers 74a are optically connected to lasers and photodiodes (PD) in an optical transceiver 73 inside a chip. The optical fibers 74a are bundled by a coating to form a fiber optic ribbon 74, which serves as a transmission path.

The coating is removed from ends of the optical fibers 74a to expose naked wires, and each of the optical fibers 74a is placed within a corresponding one of the grooves 91 of the V-groove component 90A.

The V-groove component 90A is disposed as a separate component inside the space 45 of the package substrate 10. In a case of the V-groove component 90A having reflow resistance, that is, in a case of the V-groove component 90A being made of silicon (Si) or ceramics, the V-groove component 90A may be disposed with adhesion at a position of the waveguides inside the space 45 of the package substrate 10 in advance. In a case of the V-groove component 90A being made of plastic or the like and having no reflow resistance, the package substrate 10 may initially be loaded on aboard 2 via bumps 16, and the V-groove component 90A may be made to match the position of the waveguides and be fixed with adhesion or the like inside the space 45.

In the former case, that is, in a case of disposing the V-groove component 90A on the package substrate 10 before reflowing, the pigtail-connected optical fibers (hereinafter also called "fiber pigtails") 74a are thermo-resistantly coated.

In the configuration of FIGS. 9A to 9D, the optical fibers 31a of the optical connector 20 are disposed obliquely downward from the upper side within the grooves 91 in the sloping part 25 of the ferrule 21. Hence, each of the optical fibers 31a is guided by the sloping part 25 and the presser member 24 into the corresponding groove 91 of the V-groove component 90A to mount the optical connector 20. When the optical fibers 31a are optically connected to fiber pigtails 74a in the grooves 91, the connected parts are stably held by the presser member 24. A sequence of processes in connecting the optical connector 20 is similar to the sequence illustrated in FIGS. 8A to 8C.

The ends of wire parts of the fiber pigtails 74a may preferably be laser cut. The leading ends of the optical fibers 31a of the optical connector 20 are also laser cut. According to the configuration of the system board 1B, it may be possible to stably connect the optical fibers 31a to the fiber pigtails 74a by the bending load of the optical fibers 31a while the variability in length of the leading ends of the optical fibers 31a are absorbed within the space 45 of the package substrate 10.

Figure 10A:
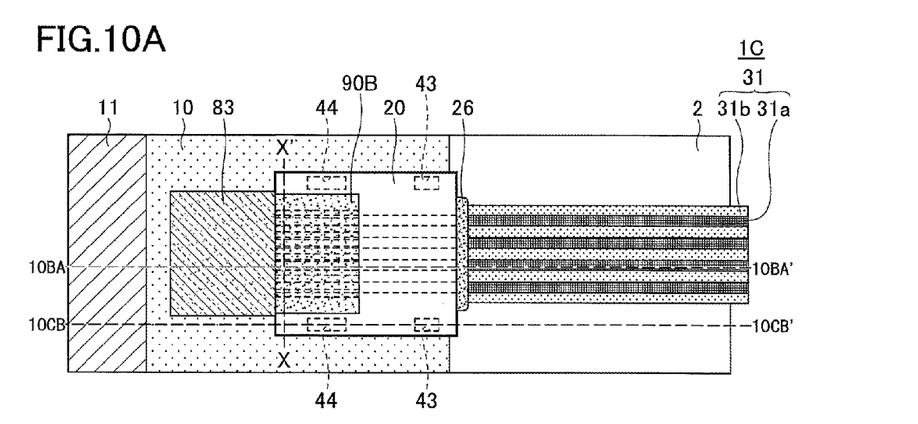
FIGS. 10A to 10D are diagrams illustrating an example of connecting the optical fibers to silicon photonics optical waveguides.
Figure 10B:
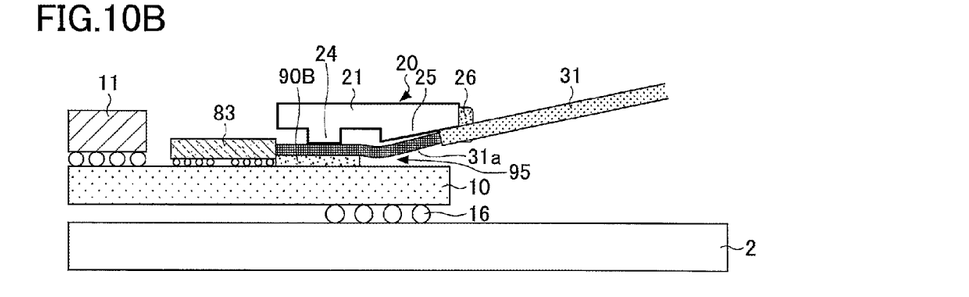
Figure 10C:
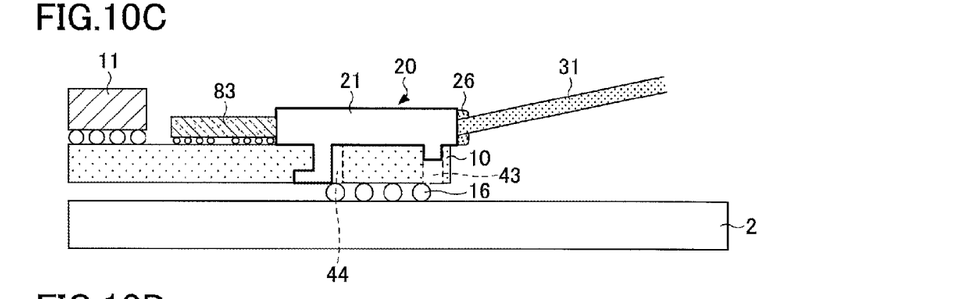
Figure 10D:
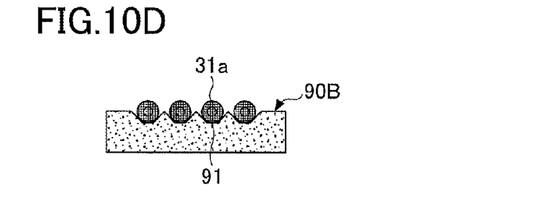

FIGS. 10A to 10D illustrate a system board 1C as another example of the electronic apparatus. FIG. 10A is a plan diagram, FIG. 10B is a cross-sectional diagram cut along 10BA-10BA' of the FIG. 10A, FIG. 10C is a cross-sectional diagram cut along 10CB-10CB' of the FIG. 10A, and FIG. 10D is a cross-sectional diagram illustrating a V-groove component 90B applied to the package substrate 10. In an optical transceiver 83 of FIGS. 10A to 10D, optical waveguides are formed inside a chip similar to photonics. In this configuration, the optical fibers 31a of the optical connector 20 are connected by allowing the optical fibers 31a to contact end faces of the waveguides inside an optical transceiver 83. The end faces of the optical transceiver 83 connected to the optical fibers 31a include not-illustrated spot-size converters (mode conversion structures). Hence, the thin line waveguides within silicon photonics and the single mode fibers 31a may be efficiently connected by a butt joint method.

The V-groove component 90B is accurately mounted on the package substrate 10 to match the waveguides within the optical transceiver 83. Grooves 91 of the V-groove component 90B are accurately aligned with respect to not-illustrated silicon photonics waveguides to match pitches in an in-plane direction and positions in a height direction of the grooves 91.

The optical fibers 31a held by the ferrule 21 of the optical connector 20 are guided by the sloping part 25 and the presser member 24 of the ferrule 21 in the grooves 91 of the V-groove component 90B when mounting the optical connector 20. The V-groove component 90B is accurately aligned with respect to the silicon photonics waveguides inside the optical transceiver 83. Hence, the positions of the cores of the optical fibers 31a guided in the grooves 91 match the positions of the spot-size converters.

A sequence of processes in connecting the optical connector 20 is similar to the sequence illustrated in FIGS. 8A to 8C. The optical fibers 31a may be bent within a space 95 above the package substrate 10 when the optical connector 20 is fixed to the package substrate 10. The optical fibers 31a may be pressed by the application of the bending load on the end surfaces of the silicon photonics waveguides of the optical transceiver 83.

In the example of FIGS. 10A to 10D, the optical transceiver 83 is assumed as the substrate having silicon photonics; however, the optical transceiver 83 is not limited to this example. The optical transceiver 83 may be a chip having an interface of polymer waveguides formed in the substrate made, for example, of silicon, or of quartz waveguides formed in a quartz substrate. Further, a combination of the optical connector 20 and the V-groove component 90B may be used for coupling with an optical element such as a laser formed on a compound (e.g., GaAs and InP) semiconductor substrate. Further, the groove component 90 illustrated in FIGS. 9A to 9D, or FIGS. 10A to 10D is not limited to the V-groove component, and the groove component 90 may be a U-groove component.

The ferrule 21 of the embodiment includes a pair of the hooks 23 one on each side of the fiber optic ribbon 31, and a pair of the projections 22 one on each side of the fiber optic ribbon 31; however, the ferrule 21 of the embodiment is not limited to this configuration. Each of the hooks 23 and a corresponding one of the projections 22 may be disposed at diagonally opposite corners of the fiber optic ribbon 31.

As illustrated above, according to the configuration of the embodiment, the optical connector 20 may be fixed to the package substrate 10 without having a separate adaptor disposed on the package substrate 10 by forming the holes 43 and 44 for fixing the optical connector 20 in the package substrate 10, and disposing the projections 22 and the hooks 23 on the optical connector 20.

Further, according to the configuration of the embodiment, the optical fibers 31a may be implemented in the grooves 41 of the package substrate 10 by forming the sloping part 25 of the optical connector 20. Further, according to the configuration of the embodiment, the space 45 provided above the package substrate 10 may allow the bending of the optical fibers 21a when mounting the optical connector 20 on the package substrate 10 while guiding the optical fibers 31a to a connecting position where the optical fibers 31a are connected to the waveguides in the substrate 10. Moreover, since the leading ends of the optical fibers 31a are pressed against the waveguides by the bending load that is applied to the optical fibers 21a, the optical connection may be implemented at low loss. The above configuration may realize a thin and low-loss optical connector 20.

According to the configuration of the embodiment, since the grooves 27 for holding the optical fibers 31a are formed in the sloping part of the optical connector 20, it may be possible to hold the optical fibers 31a at appropriate pitches relative to the leading ends of the optical fibers 31a. According to the configuration of the embodiment, when optical coupling positions, where the waveguides 14 and 74 are coupled with the optical fibers 31a, are located inside the ferrule 21, it may be possible to protect the optical coupling positions from being damaged or contaminated.

The electronic apparatus having the above-described optical connector may maintain stable optical coupling, be minimally susceptible to breakage, and allow easy attachment or detachment for replacing electronic components.

The above-described configuration may provide an easy and reliable method for mounting an optical connector on a substrate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical connector that is connectable to a substrate, comprising:
    an optical fiber; and
    a ferrule configured to hold the optical fiber, and having a front part along a connecting direction of the optical connector with respect to the substrate, a rear part along the connecting direction, and a bottom face,
    wherein the ferrule has a hook and a presser member provided on the bottom face at the front part of the ferrule, a projection provided on the bottom face at the rear part of the ferrule, and a sloping part including a groove formed in the bottom face to hold the optical fiber, and
    wherein the optical fiber is held obliquely downward toward the substrate by the sloping part from the rear part of the ferrule toward the presser member of the ferrule.

2. The optical connector as claimed in claim 1, wherein the optical fiber is configured to bend at a lower part of the sloping part when the optical connector is connected to the substrate.

3. The optical connector as claimed in claim 1,
    wherein the hook includes a pair of hooks one on each side of the bottom face at the front part, and
    wherein the presser member resides between the pair of hooks.

4. The optical connector as claimed in claim 1,
    wherein the projection includes a pair of projections one on each side of the bottom face at the rear part, and
    wherein the sloping part resides between the pair of projections.

5. The optical connector as claimed in claim 1,
    wherein the hook includes a pair of hooks one on each side of the bottom face at the front part,
    wherein the projection includes a pair of projections one on each side of the bottom face at the rear part,
    wherein the presser member resides between the pair of hooks, and
    the sloping part resides between the pair of hooks and between the pair of projections.

6. The optical connector as claimed in claim 5, further comprising:
   a fiber optic ribbon having a plurality of optical fibers including the optical fiber,
   wherein the sloping part includes a plurality of grooves, including the groove, formed in the bottom face to hold the plurality of optical fibers.

7. The optical connector as claimed in claim 6, wherein, in a state in which the optical connector is connected to the substrate, a flexure part of at least one of the plurality of optical fibers is accommodated within a space that is formed between the bottom face of the ferrule and the substrate and extends from the presser member toward the rear part.

\* \* \* \* \*